Patented Oct. 10, 1939

2,175,273

UNITED STATES PATENT OFFICE 2,175,273

CYCLIC PROCESS FOR MAKING ZINC SULPHIDE PIGMENT

Albert T. Mertes, Newport, Del., assignor to E. I. du Pont de Nemours & Company, Wilmington, Del., a corporation of Delaware No Drawing. Application July 31, 1937, Serial No. 156,752

10 Claims. (Cl. 23—135)

The present invention relates to an improved process for the production of pigment zinc sulphide. More particularly, it relates to a process for the manufacture of pigment zinc sulphide from oxidic zinc materials, especially from impure zinc oxide and a soluble sulphide in the presence of an ammoniacal solution. Still more particularly, this invention relates to the cyclic use of the ammoniacal liquor for dissolving zinc in the process of producing pigment zinc sulphide.

Pigment zinc sulphide has heretofore been made chiefly by the precipitation from zinc chloride or zinc sulphate solutions with sodium sulphide, barium sulphide, or hydrogen sulphide. These methods involve the production of purified solutions of zinc chloride or sulphate and subsequent precipitation of zinc sulphide with sodium or barium sulphide or with gaseous hydrogen sulphide. The zinc sulphide is separated by filtration and washing. In the case of zinc sulphide precipitated in the presence of sodium or barium salts these are so strongly absorbed in the pigment that they cannot be readily removed by washing. Moreover, as washing proceeds, the zinc sulphide precipitate tends to become peptized and change to a slimy colloidal form that further increases the resistance to washing. The precipitate often dries to a hard gummy translucent mass which after calcination for development of pigment properties is hard in texture, of poor color, and of low strength or hiding power. Moreover, the pigment contains variable amounts of absorbed salts that are retained by the pigment and which deleteriously affect the pigment properties. In the case of zinc sulphide precipitated by hydrogen sulphide, the concentration of the zinc solution must be kept low in order that the acid liberated does not reach a concentration sufficient to redissolve the precipitated zinc sulphide. Even under favorable working conditions the precipitation of the zinc sulphide is not complete. The production of zinc sulphide by introducing hydrogen sulphide into a solution of zinc sulphate was practiced in the prior art. It was found, however, that the zinc sulphate solution which was used contained only 30 g. of zinc per liter and the spent solution contained 1.5 g. of zinc per liter. Therefore, in order to obtain more complete precipitation of the zinc by hydrogen sulphide it became necessary to neutralize the acid formed or dilute the solution thus necessitating increasing the volume of the solution handled with the attendant increased cost of filtration and reduced capacity of the equipment. Additionally, an important disadvantage encountered in handling acid zinc liquors such as those containing sulphuric acid or zinc chloride is the corrosiveness of such solutions on iron and other metallic materials of construction.

Further, these methods for the manufacture of zinc sulphide involve discarding the solution separated from the zinc sulphide; or if not discarded, the employment of chemical change for the regeneration of the constituents involved.

This invention has as an object the precipitation of zinc sulphide from an ammoniacal zinc solution, preferably by means of hydrogen sulphide, although other soluble sulphides may be employed with fairly satisfactory results. A further object is the recovery of the materials used to effect the reaction in such form that the carrier solution can be directly used in a cyclic manner. A still further object is the extraction of zinc from impure or commercial zinc oxide materials and production of pure zinc sulphide which on calcination is freed from absorbed ammonium salts. Additional objects will become apparent from a consideration of the following description and claims.

Broadly the present invention comprises the recovery of zinc in the form of zinc sulphide from an ammoniacal solution of its soluble salts by adding to said ammoniacal solution sulphur compounds which compounds are capable of precipitating zinc therefrom as zinc sulphide.

In a more restricted sense the present invention comprises extracting zinc from impure oxidic zinc materials by treating said oxidic zinc with an ammonium salt solution containing ammonium hydroxide. The oxidic zinc material is contacted with such ammoniacal ammonium salt solution until the solution of zinc has reached the desired concentration. If desirable, elevated temperatures may be employed to hasten the solution process or to increase the solubility of zinc. The undissolved residue is then separated from the ammoniacal zinc liquor after which the zinc liquor is purified by known means. The resulting purified ammoniacal zinc liquor is then treated with a soluble sulphide. The zinc sulphide and ammoniacal liquor are separated from each other and the ammoniacal liquor is then ready for reuse in the cyclic process.

The preferred embodiment of the present invention comprises treating an impure oxidic zinc material with an ammonium salt solution containing ammonium hydroxide. Superior pigments showing exceptionally high tinting strength and obscuring power have been obtained by the use of ammonium sulphite and ammonium thiosulphate and they are therefore the preferred salts. This ammoniacal salt solution is heated at a temperature preferably between about 20° C. to about 60° C. until the required reaction between the zinc and the ammoniacal liquor takes place. Thus, if an ammoniacal sulphite solution is employed the following chemical equation represents the mechanism of the reaction which takes place during the dissolving operation:

(1) $ZnO + (NH_4)_2SO_3 + 2NH_4OH \rightarrow$
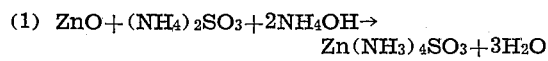
$Zn(NH_3)_4SO_3 + 3H_2O$ Impurities in the zinc materials such as silicates, iron, lead manganese, etc., are practically insoluble and are separated from the zinc solution by filtration. The resulting ammoniacal zinc liquor is further purified from traces of iron and manganese by suitable oxidizing or absorbing agents and from heavy metals such as copper, cadmium, nickel, etc., by zinc dust reduction. The resulting purified ammoniacal zinc liquor is directly treated with a soluble sulphide, preferably hydrogen sulphide. For example, the purified liquor may be treated with $H_2S$ gas or with $H_2S$ dissolved in the ammoniacal liquor. Thus, the following chemical equation illustrates the reaction which takes place when hydrogen sulphide is used:

(2) $Zn(NH_3)_4SO_3 + H_2S + 3H_2O \rightarrow$
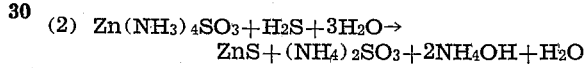
$ZnS + (NH_4)_2SO_3 + 2NH_4OH + H_2O$ The zinc sulphide is precipitated readily and completely. After filtering and washing, the precipitate is quite pure except for small amounts of ammonium salts absorbed on the pigment. When the pigment is calcined these absorbed ammonium salts volatilize completely, leaving the resulting pigment in a soft and exceptionally pure condition. Since it is not necessary to wash the zinc sulphide for complete removal of ammonium salts this operation can be accomplished expeditiously and with a limited volume of wash water. The removal of the minor amount of ammonium salts retained with the cake moisture or absorbed on the zinc sulphide is readily effected by calcination. The resulting zinc sulphide obtained is usually over 99% pure.

The net result of the above reactions is:

(3) $ZnO + H_2S \rightarrow ZnS + H_2O$

Theoretically the only change in concentration of the cyclic ammoniacal solution is due to one molecule of water formed for each molecule of zinc sulphide produced. In actual practice this dilution can be ignored since the generation of the ammonium hydroxide and ammonium carbonate to replace material losses by the use of $NH_3$ and $SO_2$ gas will restore the concentration and original volume of the ammoniacal liquor used in a cycle.

This process requires no evaporation or separate processing for recovery of the cyclic ammoniacal liquors.

This invention may be more readily understood from a consideration of the following examples:

*Example I*

An ammoniacal sulphite solution was prepared by passing $SO_2$ into $NH_4OH$. The solution analyzed 61.7 g. $NH_3$/l. and 92.3 g. $SO_2$/l.

Crude zinc oxide was added and the mass was agitated at room temperature until the zinc oxide was substantially completely dissolved. The undissolved residue was separated by filtration. The clear filtrate contained .002 g. of iron per liter. Removal of iron was effected by agitation with a relatively small amount of meta-stannic acid (stannic hydroxide) which absorbed the iron. The meta-stannic acid was filtered off. The clear filtrate (ammoniacal zinc sulphite solution) was treated with a minor amount of zinc dust to precipitate traces of tin and other heavy metals such as copper, lead, cadmium, etc. The purified ammoniacal zinc sulphite solution analyzed as follows:

| | |
|---|---|
| Zn | 66.6 g./l. |
| $NH_3$ | 55.2 g./l. |
| $SO_2$ | 73.2 g./l. |
| Fe | .0002 g./l. |

The solution was agitated and $H_2S$ gas was introduced. The temperature at the start of precipitation measured 37° C. and at the end 60° C. The zinc sulphide precipitate was filtered and washed with a limited quantity of water. Recovery of $NH_3$ in the filtrate was 99.1% and of $SO_2$ 75.6%.

The zinc sulphide was dried and calcined in conventional manner.

When calcined at 800° C. in a non-oxidizing atmosphere the excellent quality of the pigment is shown by the following test results:

| | |
|---|---|
| Tinting strength | 280 % |
| Color | 13 |
| ZnS content | 99.26% |
| ZnO content | 0.12% |

Tinting strength was determined substantially as described by Booge and Eastlack on p. 11 of the April 16, 1924 issue of "Paint, Oil and Chemical Review". The above tinting strength which is also a measure of the hiding power and hence the value as a pigment indicates the high quality in this respect since commercial zinc sulphides on the market when compared on the same scale run only 230 to 250% in tinting strength.

Color was determined substantially as described by Booge and Eastlack on p. 11 of the April 9, 1924 issue of "Paint, Oil and Chemical Review". The satisfactory color of the above product may be judged by the fact that pigment grading 10 or better on the same color scale is of marketable quality.

*Example II*

Ammoniacal ammonium thiosulphate solution was prepared by heating a solution of ammoniacal ammonium sulphite with sulphur. This solution was then reacted with zinc oxide at substantially room temperature. The resulting zinc thiosulphate solution analyzed as follows:

| | | |
|---|---|---|
| Zn | 129.0 | g./l. |
| Total $NH_3$ | 113.5 | g./l. |
| $S_2O_3$ | 342 | g./l. (126 g. Zn) |
| $SO_2$ | 5.35 | g./l. ( 2.4 g. Zn) |

To this clear zinc thiosulphate solution containing a minor amount of zinc sulphite $H_2S$ gas was introduced while subjecting the reaction mixture to efficient agitation. After complete precipitation of the zinc as zinc sulphide the latter was removed by filtration and subjected to limited washing with water. The filtrate was utilized in the preparation of further quantities of zinc thiosulphate for continuation of the process. The zinc sulphide was calcined in a non-oxidizing atmosphere yielding excellent pigment of the following properties:

| | |
|---|---|
| Tinting strength | 286 % |
| Color | 14 |
| ZnS content | 99.63% |
| ZnO content | 0.41% |

These properties attest the high quality of the product with respect to tinting strength and color. All other pigment properties were normal. When this pigment was ground in conventional paint vehicles the excellent color and high tinting strength were reflected in the superior color and high hiding power of the paint as compared with paints prepared in similar manner from commercial zinc sulphide pigments on the market.

Although the above Examples I and II represent the preferred methods of practicing my invention, I may also use other ammoniacal ammonium salt solutions for dissolving oxidic zinc materials. It will be seen, however, that while entirely satisfactory pigment quality results from the employment of such other salts the products from sulphite and thiosulphate solutions are superior, especially with respect to the very important property, tinting strength.

Example III 1,000 parts by weight of crude zinc oxide containing 5% of zinc sulphide were slurried in 5,000 parts by weight of water. 2,000 parts by weight of 28% ammonium hydroxide solution were added and the slurry was heated to about 50° C. A stream of carbon dioxide gas was introduced into the slurry. When the major portion of the zinc had passed into solution the undissolved residue was removed by filtration. The filtrate, an ammoniacal solution of zinc ammonium carbonate, contained an equivalent of 81.5 g. of zinc oxide per liter. Said solution was agitated and a minor amount of zinc dust was added. After about one-half hour of agitation with zinc dust the latter was removed by filtration and the filtrate was found to be free of iron and of heavy metals such as copper, cadmium, lead and nickel.

A relatively small portion of this filtrate (ammoniacal zinc carbonate) was introduced into the reaction vessel and hydrogen sulphide gas was passed into said zinc solution until complete precipitation of the zinc was effected. Then further amounts of hydrogen sulphide and ammoniacal zinc carbonate were introduced concurrently into the reaction vessel at substantially chemical equivalent rates. The endpoint of the reaction was controlled at slight soluble sulphide excess. The zinc sulphide slurry was filtered. The filtrate, zinc free ammoniacal ammonium carbonate, was utilized for dissolving further quantities of zinc for continuation of the process. The zinc sulphide precipitate was washed with a limited quantity of water to recover practically all of the ammoniacal solution and was then dried and calcined in conventional manner. The resulting pigment quality is indicated by the following tabulation of properties:

| Calcination temperature ° C. | Color | Tinting strength | ZnS | ZnO |
|---|---|---|---|---|
| | | | Percent | Percent |
| 750 | 12 | 230 | 99.8 | .13 |
| 800 | 13 | 235 | | |

Example IV 350 gallons of an ammoniacal zinc liquor obtained by leaching by-product zinc oxide with an ammoniacal ammonium carbonate solution were reacted with 260 gallons of an ammoniacal ammonium carbonate-hydrogen sulphide solution.

The ammoniacal zinc liquor analyzed as follows:

| | |
|---|---|
| Zn | 74.9 g./l. |
| $NH_3$ | 59.6 g./l. |
| $CO_2$ | 59.7 g./l. |

The ammoniacal ammonium carbonate-hydrogen sulphide solution analyzed:

| | |
|---|---|
| $H_2S$ | 86.7 g./l. |
| $NH_3$ | 120.0 g./l. |
| $CO_2$ | 109.0 g./l. |

The zinc sulphide was recovered by filtration. The filtrate was utilized in preparation of zinc solution for continuation of the process. The zinc sulphide was washed with a limited quantity of water and was calcined at 780° C. in a substantially non-oxidizing atmosphere. The good quality of the resulting pigment is indicated by a tinting strength value of 260 and a color grading of 12.

Example V

Crude zinc oxide was agitated with an ammoniacal solution of ammonium sulphate. The zinc solution was separated from undissolved residue and analyzed as follows:

| | |
|---|---|
| Baumé | 32.4° at 20° C. |
| Zn | 120.5 g./l. |
| $NH_3$ in the form of $NH_4OH$ | 51.0 g./l. |
| $(NH_4)_2SO_4$ | 39.2 g./l. |
| Fe | Slight trace |
| Heavy metals | Absent |

Hydrogen sulphide was introduced into a relatively small quantity of water in the reaction tank then while agitating the contents of the tank, hydrogen sulphide and the zinc liquor were introduced concurrently at substantially chemical equivalent rates, maintaining always a slight excess of soluble sulphide in the zinc sulphide slurry. The zinc sulphide slurry was filtered and the filter cake was washed with a limited quantity of water. The filtrate was returned to the process for dissolving further quantities of zinc for a repetition of this procedure while the zinc sulphide was dried then calcined in a substantially non-oxidizing atmosphere at 780° C. The resulting pigment tested as follows:

| | Per cent |
|---|---|
| Tinting strength | 260 |
| Color | 14 |
| ZnS | 99.9 |
| ZnO | 0.05 |

Example VI

Zinc skinnings (from galvanizing operations) were dissolved in an ammoniacal solution of ammonium chloride. The resulting filtered zinc solution analyzed:

| | |
|---|---|
| Zn | 117 g./l. |
| Total $NH_3$ | 120.8 g./l. |
| Cl | 143.3 g./l. |

The solution was purified of its small iron content by oxidation of the same followed by filtration.

Heavy metals were then removed from the solution by agitation with minor amounts of zinc dust.

The purified zinc solution was diluted to a zinc content of 50.4 g./l. and hydrogen sulphide was introduced in the manner described in Example V. The zinc sulphide precipitate was filtered, washed, dried and calcined at 700° C. in a non-oxidizing atmosphere. The filtrate was reused for dissolution of further quantities of zinc materials. The pigment resulting from this operation tested:

| | |
|---|---|
| Tinting strength | 264% |
| Color | 14 |
| ZnS | 99.5% |
| ZnO | 0.10% |

It is to be understood that the aforementioned examples are representative merely of the means of carrying out the present invention. These examples may be varied within wide limits, both as respects the materials reacted and as respects the conditions under which they are reacted. Thus, ammonium sulphite, thiosulphate, chloride, sulphate, nitrate, carbonate, phosphate, etc., or mixtures of the same, or organic ammonium salts such as formate, acetate, oxalate, etc., in the presence of free ammonium hydroxide may be employed. However, it is to be understood that sulphite and thiosulphate are the preferred salts since these salts produce results which are much superior to the results produced when the other mentioned salts are employed.

Alternative to the methods exemplified for precipitation of zinc sulphide by introducing $H_2S$ gas into the zinc solution I may absorb the gas in an ammoniacal salt solution, such as in an ammoniacal ammonium sulphite solution, and then react said solution with an ammoniacal zinc solution to precipitate zinc sulphide. This method has particular advantages and is the preferred method when it is desirable to utilize two solutions for the strike instead of a gas and a solution.

One particular adaptation which I contemplate is to utilize flue gases as a source of $CO_2$ or $SO_2$ or both by passing such gases into an ammoniacal solution to make a carbonate solution, a sulphite solution, a thiosulphate solution or a solution containing two or more of these constituents. Such flue gases may be passed directly into a mixture containing ammonium hydroxide and the zinc material to be dissolved.

By the term "oxidic zinc material" as used in the herein disclosure and claims I mean oxygen containing compounds of zinc which are slightly soluble in water such as zinc oxide, zinc carbonate, basic zinc carbonate, basic zinc sulphate, basic zinc chloride, etc.

The following is claimed as new and useful:

1. A process for the recovery of zinc in the form of zinc sulphide from oxidic zinc materials which comprises treating said oxidic zinc materials with an ammoniacal solution selected from the class consisting of ammonium sulphite and ammonium thiosulphate, separating the undissolved residue from the ammoniacal zinc liquor after the solution of zinc has reached the desired concentration, removing impurities from such zinc liquor, treating the resulting purified ammoniacal liquor with a soluble sulphide and thereafter separating the zinc sulphide from the ammoniacal liquor.

2. A cyclic process for the recovery of zinc in the form of zinc sulphide from oxidic zinc materials which comprises treating said oxidic zinc materials with an ammoniacal solution selected from the class consisting of ammonium sulphite and ammonium thiosulphate, separating the undissolved residue from the ammoniacal zinc liquor after the solution of zinc has reached the desired concentration, removing impurities from such zinc liquor by zinc dust reduction, treating the resulting purified ammoniacal liquor with a soluble sulphide, separating the zinc sulphide from the ammoniacal liquor, and thereafter recycling the ammonium solution for re-use in the aforesaid process.

3. A process for the recovery of zinc in the form of zinc sulphide from oxidic zinc materials which comprises treating said oxidic zinc materials with an ammoniacal solution of ammonium sulphite, separating the undissolved residue from the ammoniacal zinc liquor after the solution of zinc has reached the desired concentration, removing impurities from such zinc liquor, treating the resulting purified ammoniacal liquor with a soluble sulphide and thereafter separating the zinc sulphide from the ammoniacal liquor.

4. A cyclic process for the recovery of zinc in the form of zinc sulphide from oxidic zinc materials which comprises treating said oxidic zinc materials with an ammoniacal solution of ammonium sulphite, heating the ammonical salt solution at a temperature between about 20° C. to about 60° C. until the required reaction between the zinc and ammoniacal liquor takes place, separating the undissolved residue from the ammoniacal zinc liquor, removing impurities from such zinc liquor by zinc dust reduction, treating the resulting purified ammoniacal liquor with a soluble sulphide, separating the zinc sulphide from the ammoniacal liquor, and thereafter recycling the ammonium solution for re-use in the aforesaid process.

5. A process for the recovery of zinc in the form of zinc sulphide from oxidic zinc materials which comprises treating said oxidic zinc materials with an ammoniacal solution of ammonium thiosulphate, separating the undissolved residue from the ammoniacal zinc liquor after the solution of zinc has reached the desired concentration, removing impurities from such zinc liquor, treating the resulting purified ammoniacal liquor with a soluble sulphide and thereafter separating the zinc sulphide from the ammoniacal liquor.

6. A cyclic process for the recovery of zinc in the form of zinc sulphide from oxidic zinc materials which comprises treating said oxidic zinc materials with an ammoniacal solution of ammonium thiosulphate, heating the ammoniacal salt solution at a temperature between about 20° C. to about 60° C. until the required reaction between the zinc and ammoniacal liquor takes place, separating the undissolved residue from the ammoniacal zinc liquor, removing impurities from such zinc liquor by zinc dust reduction, treating the resulting purified ammoniacal liquor with a soluble sulphide, separating the zinc sulphide from the ammoniacal liquor, and thereafter recycling the ammonium solution for re-use in the aforesaid process.

7. A process for the recovery of zinc in the form of zinc sulphide from oxidic zinc materials which comprises treating said oxidic zinc materials with an ammoniacal solution selected from the class consisting of ammonium sulphite and ammonium thiosulphate, separating the undissolved residue from the ammoniacal zinc liquor after the solution of zinc has reached the desired concentration, removing impurities from such zinc liquor, treating the resulting purified ammoniacal liquor with a soluble sulphide selected from the group consisting of hydrogen sulphide and an ammoniacal salt solution of hydrogen sulphide, and thereafter separating the zinc sulphide from the ammoniacal liquor.

8. A cyclic process for the recovery of zinc in the form of zinc sulphide from oxidic zinc materials which comprises treating said oxidic zinc materials with an ammoniacal solution selected from the class consisting of ammonium sulphite and ammonium thiosulphate, separating the undissolved residue from the ammoniacal zinc liquor after the solution of zinc has reached the desired concentration, removing impurities from such zinc liquor by zinc dust reduction, treating the resulting purified ammoniacal liquor with a soluble sulphide selected from the group consisting of hydrogen sulphide and an ammoniacal salt solution of hydrogen sulphide, separating the zinc sulphide from the ammoniacal liquor, and thereafter recycling the ammonium solution for re-use in the aforesaid process.

9. A cyclic process for the recovery of zinc in the form of zinc sulphide from oxidic zinc materials which comprises treating said oxidic zinc materials with an ammoniacal solution of ammonium sulphite, heating the ammoniacal salt solution at a temperature between about 20° C. to about 60° C. until the required reaction between the zinc and ammoniacal liquor takes place, separating the undissolved residue from the ammoniacal zinc liquor, removing impurities from such zinc liquor by zinc dust reduction, treating the resulting purified ammoniacal liquor with hydrogen sulphide, separating the zinc sulphide from the ammoniacal liquor, and thereafter recycling the ammonium solution for re-use in the aforesaid process.

10. A cyclic process for the recovery of zinc in the form of zinc sulphide from oxidic zinc materials which comprises treating said oxidic zinc materials with an ammoniacal solution of ammonium thiosulphate, heating the ammoniacal salt solution at a temperature between about 20° C. to about 60° C. until the required reaction between the zinc and ammoniacal liquor takes place, separating the undissolved residue from the ammoniacal zinc liquor, removing impurities from such zinc liquor by zinc dust reduction, treating the resulting purified ammoniacal liquor with hydrogen sulphide, separating the zinc sulphide from the ammoniacal liquor, and thereafter recycling the ammonium solution for re-use in the aforesaid process.

ALBERT T. MERTES.